United States Patent
Shaw-Sinclair

(12) 
(10) Patent No.: US 6,851,611 B1
(45) Date of Patent: Feb. 8, 2005

(54) PERSONAL INVENTORY MANAGEMENT SYSTEM

(76) Inventor: L. Evelyn Shaw-Sinclair, 7265 Saroni Dr., Oakland, CA (US) 94611

( * ) Notice: Subject to any disclaimer, the term of this patent is extended or adjusted under 35 U.S.C. 154(b) by 225 days.

(21) Appl. No.: 09/854,293

(22) Filed: May 12, 2001

(51) Int. Cl.[7] .............................................. G06K 7/10
(52) U.S. Cl. .............................. 235/472.01; 235/462.45
(58) Field of Search ........................... 235/472.01, 383, 235/380, 385, 375, 384, 472.02, 472.03, 462.45, 462.46, 462.47; 705/26, 27

(56) References Cited

U.S. PATENT DOCUMENTS

| | | | | |
|---|---|---|---|---|
| 5,424,524 A | * | 6/1995 | Ruppert et al. ................ 705/8 |
| 5,484,991 A | * | 1/1996 | Sherman et al. ....... 235/472.01 |
| 5,640,002 A | * | 6/1997 | Ruppert et al. ........ 235/462.46 |
| 5,821,513 A | * | 10/1998 | O'Hagan et al. ........... 235/383 |
| 5,923,735 A | * | 7/1999 | Swartz et al. ............ 379/93.12 |
| 5,979,757 A | * | 11/1999 | Tracy et al. ................ 235/383 |
| 6,101,483 A | * | 8/2000 | Petrovich et al. ............. 705/26 |
| 6,129,274 A | * | 10/2000 | Suzuki ....................... 235/381 |
| 6,386,450 B1 | * | 5/2002 | Ogasawara ................. 235/383 |

* cited by examiner

*Primary Examiner*—Karl D. Frech

(57) ABSTRACT

A personal inventory system using a portable hand-held device that can read barcodes and communicate in human-readable form, whereby users can organize, access, edit and update information about items they own or are contemplating purchasing.

6 Claims, 7 Drawing Sheets

PERSONAL INVENTORY MANAGEMENT SYSTEM

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Many households have large collections of many kinds of entertainment media (for example, CDs, videotapes, videodiscs, books), and other items too numerous to keep track of easily via the methods currently in use.

At present, a person with a large collection of, for instance, music recordings, when trying to determine whether or not a new purchase would duplicate a previous one, is obliged to depend on memory alone or on unwieldy paper information, such as bundles of index cards. It is currently possible to enter data into a personal computer, and to print it out as a list. But for large collections, the printed inventories would be cumbersome, as well as quickly becoming obsolete, necessitating a lot of nuisance and waste.

If an individual must remember, after coming home to a stationary computer, to painstakingly enter information about each item purchased, as is the case at present, it is much less likely that these records will actually be kept up to date.

This invention combines hardware items that are currently ubiquitous to achieve novel results that would serve needs which nothing extant currently addresses.

Computers are not new, nor are inventory-tracking systems of various kinds, including inventory-tracking software. Hand-held scanners are in use for inventory tracking and control in warehouses and large retail stores. Some retail stores allow consumers to temporarily make use of a barcode scanner, in conjunction with a computer with a database of product information, most frequently in order to facilitate price checking. The concept of an individually owned, portable personal inventory management system is very different in its ramifications from previous utilization of these components.

A Boolean search of over 1500 patents revealed nothing comparable to this invention. Patents which deal with barcode readers in conjunction with inventories are all aimed at businesses. For example, U.S. Pat. No. 5,939,695 (for a "Product identification system using band-held customer assistant unit with a code reader") is designed to benefit retailers. None of the patents referred to equipment owned by an individual consumer, rather than a store or other corporate entity.

In recent months there has been a lot of discussion on the internet about ways to take advantage of a device called the CueCat, containing a barcode scanner, which is being given away by a company called Digital Convergence (401 Park Avenue South, New York, N.Y. 10016). Several web sites have instructions and suggestions for modifying these devices from their original purpose. A few people mention turning the barcode scanner in the device to the purpose of reading barcode data of various kinds. However, the CueCat is very limited in processing capability, so it can not store much information. These are used while physically connected to a computer, taking advantage of the computer's processing power and memory storage.

Cross (A. T. Cross Company, Lincoln, R.I.) offers a variant of the CueCat device in a portable form. It resides inside a Cross pen, and can scan and retain a limited number of barcodes. It has no display. Someone with this device can load the saved information into a computer via a docking device. That is the extent of its capabilities, so it is of limited usefulness.

Another company to suggest alternative uses for CueCats is Readerware (P.O. Box 12325, San Francisco, Calif. 94112-0325). This company makes software which can be used in conjunction with various barcode readers and computers to compile databases of information and to catalogue an inventory of books. This software helps users search for barcode-encoded data on the internet.

A new version of Readerware's software is available for porting data to a Palm Pilot (Palm, Inc. 5470 Great America Pkwy Santa Clara, Calif. USA 95052), which is a portable data storage device with a digital display. By loading data to the Palm Pilot, a user is enabled to take a database, such as a want-list of desired books, on shopping expedition. However, the Palm Pilot is not equipped for intake of information other than by coupling with a computer or via hand data entry, and lacks the software to decrypt barcode data on its own. Nor can it do the data-base comparisons to tell a shopper whether or not an item already is in "owned" inventory.

These recent technological developments appear to be leading toward the eventual development of a cohesive system such as the present invention, but none of them takes into account all of the needs that this invention addresses in one integrated package. All of them have significant gaps. Therefore, it would seem that the present invention is not an obvious use of the technologies it brings together.

BRIEF SUMMARY OF THE INVENTION

The invention is a method for keeping track of whatever items a user wishes to have catalogued in data bases. It is an integrated solution to many problems associated with all of the forgoing alternative. The system is simpler, more flexible, more comprehensive and less difficult to implement than any other methods of the past and present.

Basically, this invention consists of a portable band-held device incorporating a small computer with a readout screen, equipped with (or interfacing with) a barcode scanner, plus software enabling it to interact with and manipulate data in various ways (for instance, to create data bases, to accept new data into existing data-bases, to compare data bases, and to edit them).

Portability and Interactivity

The device can display its information in human readable form, as well as having a keypad for data entry by hand. Since a person can interact directly with the device without the necessity of docking with a computer at home, the device makes itself useful in ways that are beyond anything presently available.

The intent is to take maximum advantage of the portability of powerful yet small digital data devices, to provide humans with the memory aids they need when and where they most need them. While a user is away from home, with this invention, data can be acquired via barcode reader and comparisons run with data in storage. The results can be viewed immediately. This gives users an unprecedented mnemonic assistance while shopping

Personal Shopping Assistance

Inventories stored in the hand-held device, with or without additional programming from catalogue databases, can be used in stores for facilitating purchase decisions as well as recording new additions. Preprogrammed with all previous purchases of similar items, the invention can tell its owner whether or not an item contemplated for purchase would be a duplication, upon either manual entry of numerical data or scanning of the item's bar-code.

By pre-loading the device with a database of product information, such as a book catalogue in digital form, or a portion thereof, a personal "wish list" can be stored as a memory aid while shopping. New items could be added to the wish list by entering product codes of items deemed desirable.

Digital data could be downloaded from the internet from web sites of the many companies desiring to make it convenient for people to buy their products.

The portable hand-held device can make use of existing technology to dock with a personal computer to exchange information, both to upload files for storage onto the computer or to acquire new data, as well as taking advantage of other functions of a desktop computer, such as printing capability.

The Simplest Embodiments

In one embodiment of the invention, the entire device is housed in one unit. This maximizes integration, and makes for cost-effective manufacturing, so that it maximizes value. This all-in-one approach also serves the consumer by minimizing the clutter and confusion that come from having to integrate software and hardware from several different companies on their own. The simplest embodiments smooth the way for easy use, as, at present, it takes a lot of technical know-how to rig up the components and find or write software to achieve anything near the functionality of this invention. By packaging it all together, the problem of shared responsibility is eliminated, so that if something goes wrong, instead of wondering which unit in a chain has failed or caused the problem, there is just one supplier to go to for support.

The simplicity and ease of use of the least complicated embodiments make such systems attractive to even the minimally technically astute; a tool that a great number of people can make use of.

The scope of the invention includes very task-specific embodiments, such as units that are factory configured to include a particular database, such as a "best hits" list of music titles, or a database of mystery books, for those who value simplicity, ease of use, and who don't need more features or capacities.

It may be desirable to make use of the various types of removable memory (either as the "Smart Card" type solid state memory, or disc based) in order to give added flexibility and functionality to the simplest devices. That way, the removable memory could be replaced by one with a more up-to-date data base, or a completely different one.

More Extensive Embodiments

The more extensive embodiments would be of use to people who have more varied collections, who wanted to catalogue a number of separate sets of data, for whom flexibility would be worth some additional cost. The simplest embodiments trade extended features and utility for ease of use and cost effectiveness. People comfortable with computers will want the capability to take full advantage of the capabilities conferred by the ability to communicate with their own stored data bases and with all of the information available via the internet, as well as their own computer's other functions. Many of those people will be happy to have the extra functionality of the embodiments that include digital communications. This is easily achieved via existing technologies such as a "cradle" or docking station which is physically attached to the desktop computer, or via wireless means.

Insurance Applications

This invention makes it easy to assemble an accurate inventory and to keep it up to date. Inventories can facilitate record keeping for insurance purposes.

As previously noted, many households have large collections of entertainment media (for example, CDs, videotapes, VideoDiscs, books), and other items too numerous to keep track of easily via the methods currently in use.

Insurance companies can be apprised of household contents via a list that is not only very detailed, but is brought up to date frequently by individuals as they add new acquisitions to the data base of "currently owned" items. The documentation can be as effortless as scanning in a bar code, so in the case of an insurance loss it is far likelier that this means of inventory-keeping will be accurate, detailed, and up to date than with any current systems.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF PREFERRED EMBODIMENTS

Preferred embodiments of the present invention will be explained with reference to the accompanying drawings.

Figure 1:
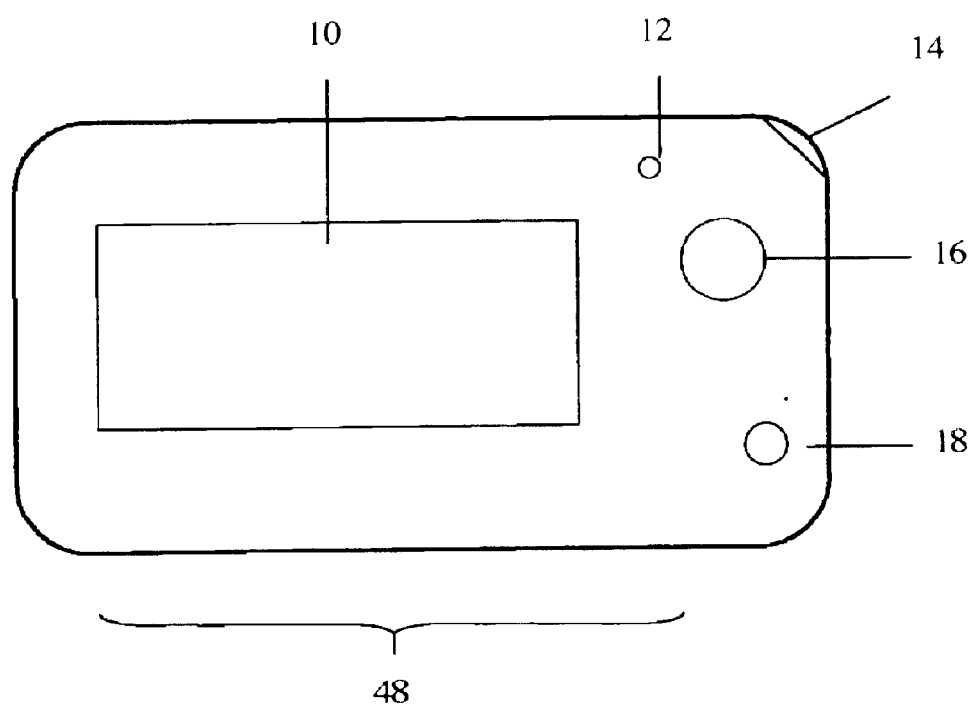
FIG. 1 is an exemplary simplified illustration showing one possible package for a self-contained embodiment of the present invention.
Figure 2:
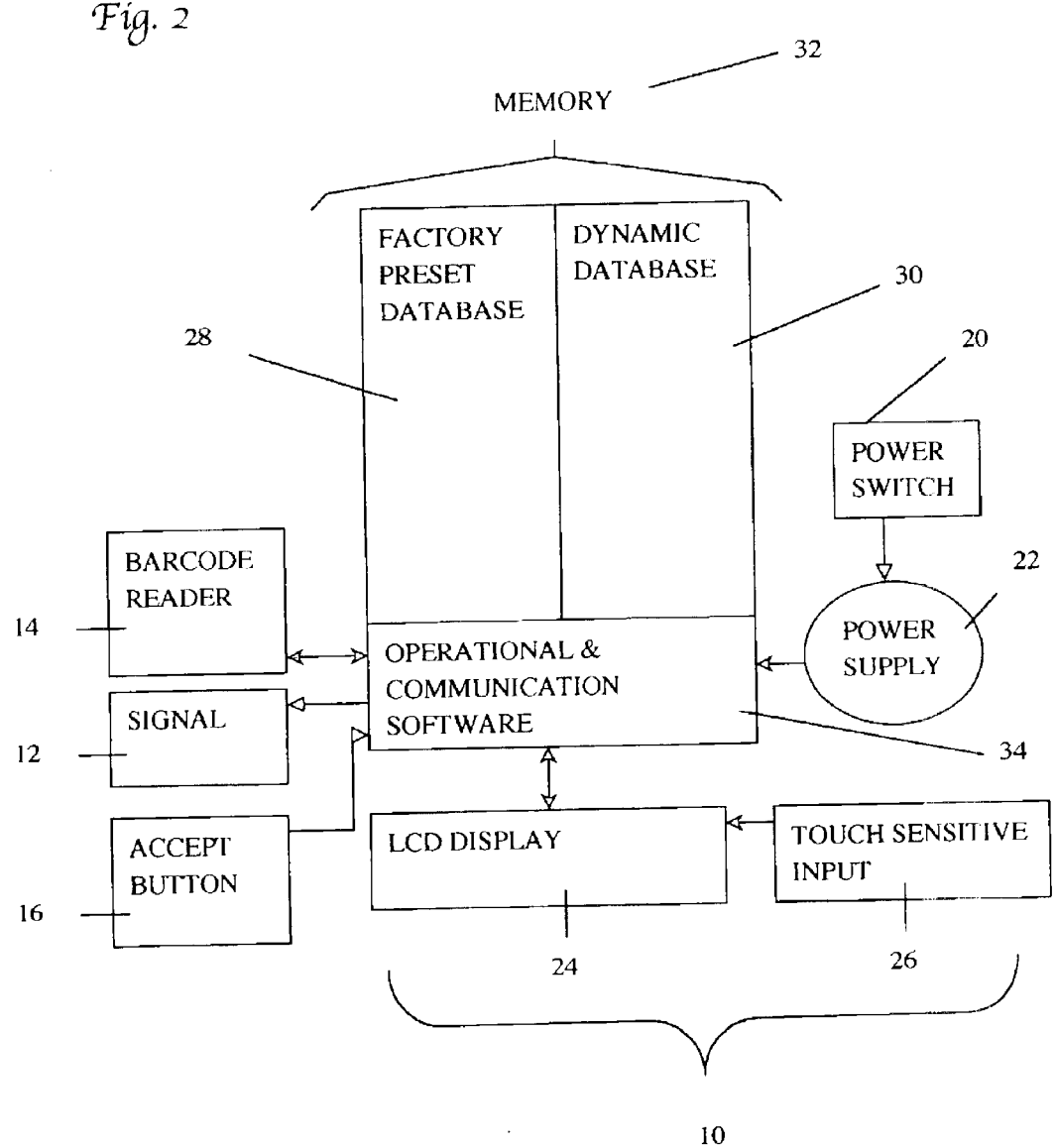
FIG. 2 is a block diagram showing the elements comprising the embodiment depicted in FIG. 1.

As shown in FIG. 1 and FIG. 2, a personal inventory management system of the present invention can be embodied all in one portable hand-held device 48. This simplest of embodiments must have a means for manual data entry, such as a touchscreen 26 or other means such as a keypad, a display 24, an integral barcode reader 14, at least one built-in database, and digital data storing and processing capacity.

FIG. 1 shows an embodiment made as user-friendly as possible, by eliminating all nonessential features, offering the personal inventory management system in its most basic form. It can occupy dimensions as small as business-card sized by ¼' thick, to maximize portability. The user interfaces with it via it's combined I/O interface, preferably a touchscreen, for manual data entry and to read information on its display screen. Using the power button 18 to turn the unit on, the user, can aim its barcode reader at a selected barcode, and get a signal confirming the successful reading of a barcode from indicator 12, which may be sonic or visual, accomplished either via a small LED or a micro sound-chip. Upon receiving the signal that a barcode has been successfully read, the user presses the accept button 16, telling the unit to store the information.

This embodiment is a device independent of any sources of input other than manual data entry and barcode scanning. Therefore, to be able to decode any set of barcodes, it must come supplied with at least one factory preset database 28. (The preset database 28 provides it with the look-up tables for reference to do the decoding.) It must have at least one dynamic database 30 as well. (The dynamic database 30 is the memory component that a accepts and stores new input, which the user can edit.) It requires enough digital processing power to run its internal software 34 and communicate via its interface 10. These, and a power supply 22, are the minimum requirements for this embodiment of the invention to function. The power supply 22 for the device can be a battery, fuel cell, photovoltaic or of any other kind. More features and functionality can certainly added to this basic minimum.

It is possible that this embodiment could be coupled with entirely different functions in one device, for the convenience of users who do not wish to have a lot of clutter about them. The nature of the invention can retain its integrity even if packaged in combination with other assistants.

An embodiment that would enhance the unit's useability would incorporate removable memory, which is available in many forms, such as Sony's Memory Stick, and the various kinds of removable data storage devices in use in digital cameras, both solid state and disc-based.

For example, if the dynamic database 30 were to be in removable form, a user would be able to have unlimited use of the unit's data-gathering capacity, as the removable memory units become a library of data on their own, like a collection of cassette tapes, or the removable memory can be loaded into a personal computer for archiving, via the same methods now used to port data from digital cameras into computers.

If factory preset databases 28 were in removable form, that would confer a different set of advantages. For example, if a user were to collect books by mystery authors, the database of mystery books could be updated by interfacing with a fresh, up to date database via download through the internet, providing the removable memory is supplied with interfacing capability. If not, the user can get new memory modules 28 from the factory, which accomplishes the goal of non-obsolescence. Also, a user could conceivably purchase different data-base modules 28, pre-loaded with an entirely unrelated database. To use the same example, if our user decided to start reading romance novels, a database devoted to listing all of the current romance novels could be purchased. This would be more economical than having to buy several entire units, either over time in order to keep up to date, or at the same time, to cover a variety of interests. For the user who has, for instance, a collection of videotapes in addition to a music library, this might be very beneficial.

One major advantage to an embodiment of an integral, all-in-one kind is that, produced in sufficient quantities, it becomes the most economical way of offering the features of the invention. For a mass-market application, this makes the most sense.

Figure 3:
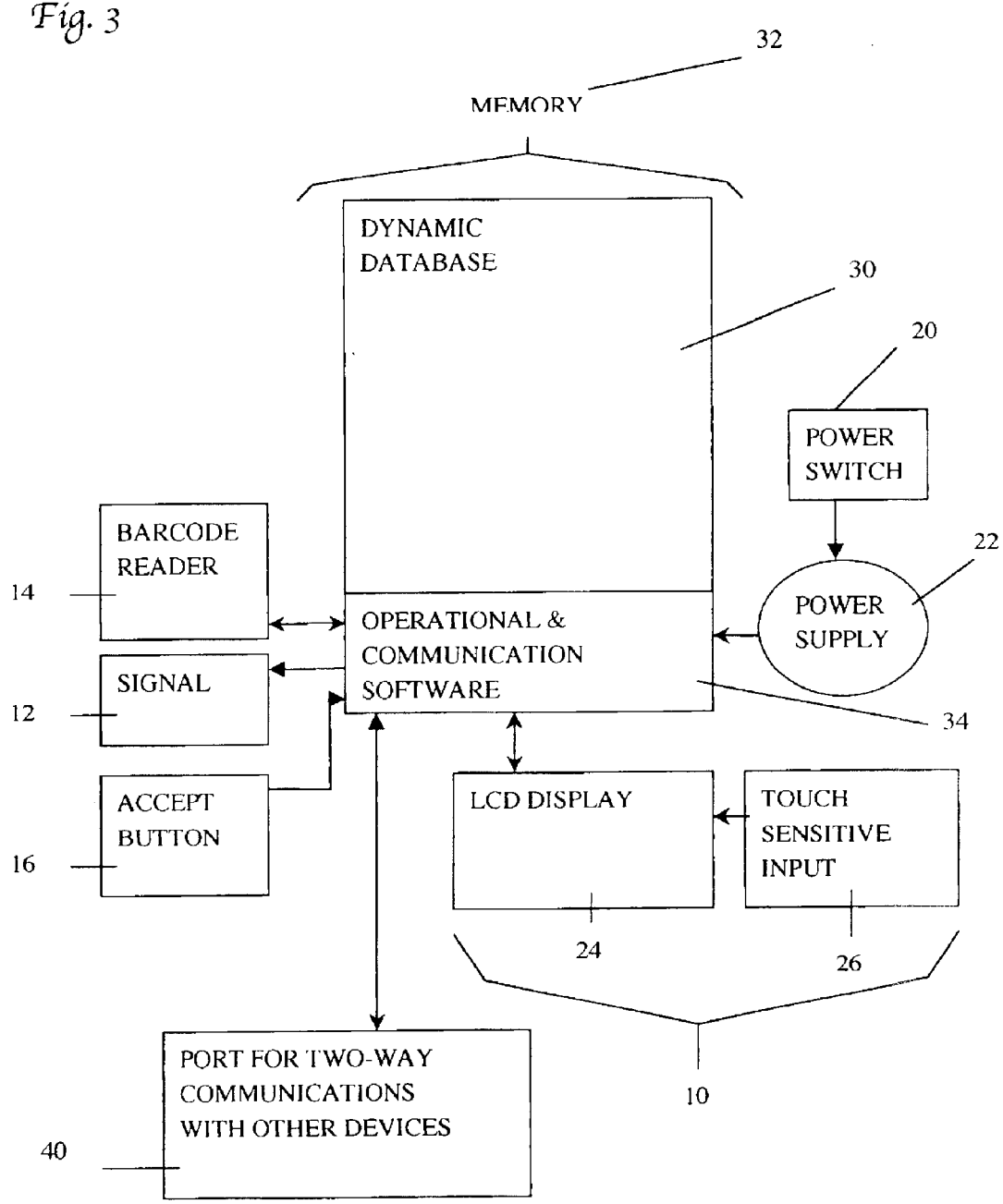
FIG. 3 is a block diagram showing the elements necessary for an embodiment equipped to communicate with other devices.

FIG. 3 shows an embodiment wherein the portable unit 48 is capable of two-way communication with other devices. The means for communication can be wireless, e.g. infrared or RF, or the portable unit 48 can be equipped to interface via a port 40 or docking station which connects to a computer. Commonly referred to as cradles, docking devices of many kinds exist to provide communications for many kinds of digital devices.

In this embodiment, while the portable unit 48 is plugged into its docking station or otherwise in communication, it can take full advantage of the capabilities of a desktop computer, for instance, to be able to view information on a large screen or to output to a printer. It can also take advantage of the communication capabilities of the internet. Many companies are eager to make information available in order to facilitate purchases of their products. Databases already exist for ISDN and UPC codes, and would be extremely easy to turn into downloadable "catalogues." This way of making information available is essentially cost-free to the companies providing it, as well as being paper-free and thus tree-friendly.

A user could find databases on the internet, and download them to his computer. When the user wished to transfer data, the port 40 would allow data flow, increasing flexibility and overall utility, and obviating the need for preprogrammed databases.

A Personal Inventory Management System can be configured with multiple dynamic databases and/or removable ones; there are tradeoffs and advantages to many possible different embodiments.

Figure 4:
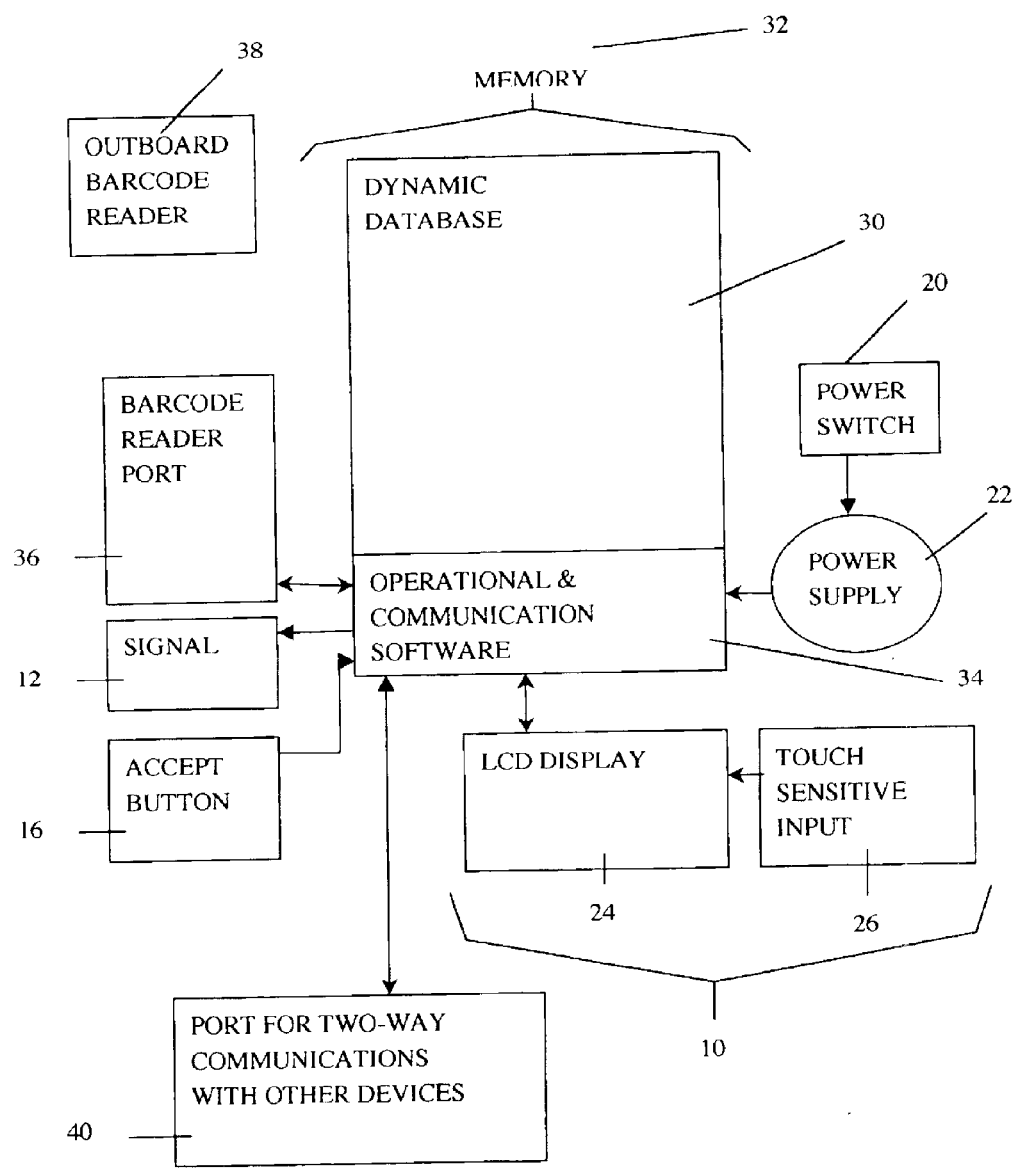
FIG. 4 is a block diagram showing an embodiment similar to FIG. 3 but utilizing an outboard barcode reader.

FIG. 4 is a block diagram showing an embodiment in which the system includes a port for connection with an outboard barcode reader 38 which is housed separately from the main unit. This embodiment recommends itself by being the easiest one to bring out in smaller quantities. Hardware which is currently available could be used to provide the physical platform for the software necessary to accomplish the functions of a personal inventory management system.

Many companies make Personal Data Assistants (PDAs), which are essentially miniature computers, offering a wide variety of capabilities and with differing capacities for expansion and add-on devices. These PDAs are typically equipped to interface with computers and sometimes other devices.

Figure 5:
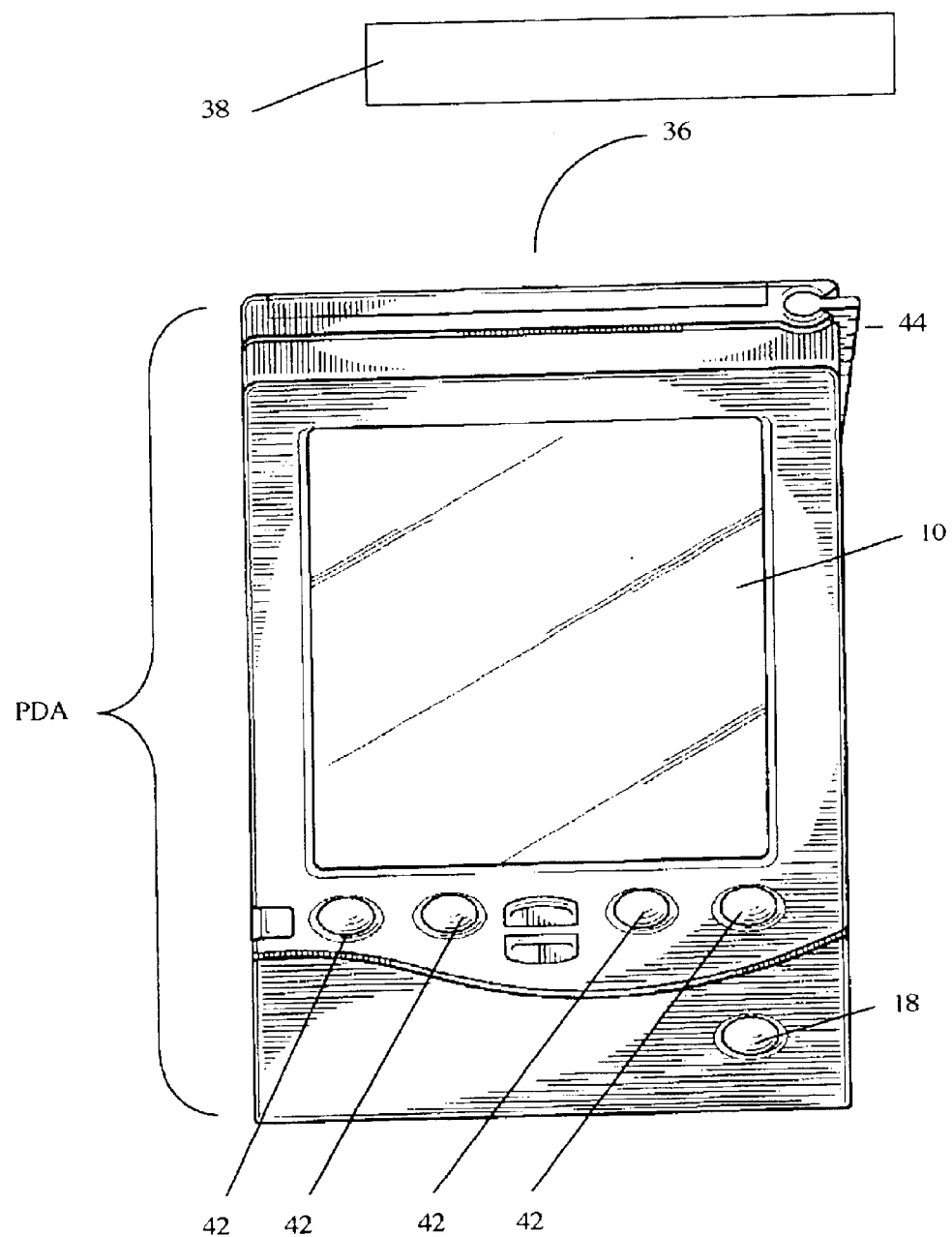
FIG. 5 is a exemplary illustration of an embodiment utilizing existing PDA hardware.

FIG. 5 is an illustration of a typical PDA. These handheld units have combination LCD readouts/touchscreens capable of performing the necessary I/O interface 10 functions, as well as offering a number of other features. A PDA usually comes equipped with a stylus 44 for use with its touchscreen 26, and it is normal for a PDA to have programmable buttons 42 to expand the range of specialized functions it can be configured to perform.

Handspring, (Handspring, Inc. 189 Bernardo Avenue View, Calif.) makes a PDA which has a dock 36 in the form of a slot on the back to accommodate different devices according to the owner's desires. Other companies make devices to fit into these docking slots 36. One such company, Symbol Technologies (Holtzville, N.Y.), markets a barcode reader module 38 which docks with Handspring PDAs. With those two devices, the only necessary addition to achieve the functionality of the present invention is the addition of software and databases.

Figure 6:
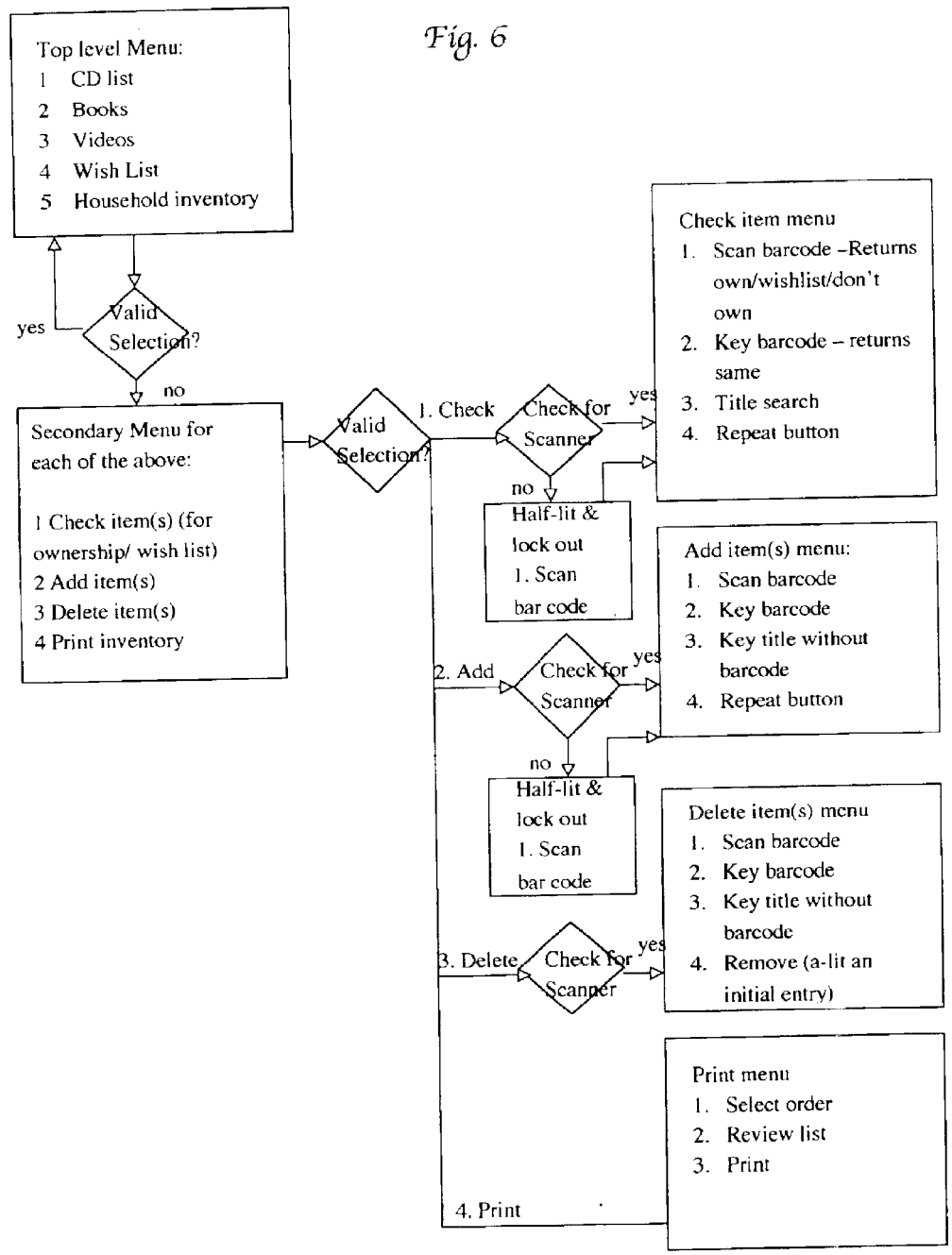
FIG. 6 is a flow diagram exemplifying software that could be used to give a personal inventory management system its basic functionality.
Figure 7:
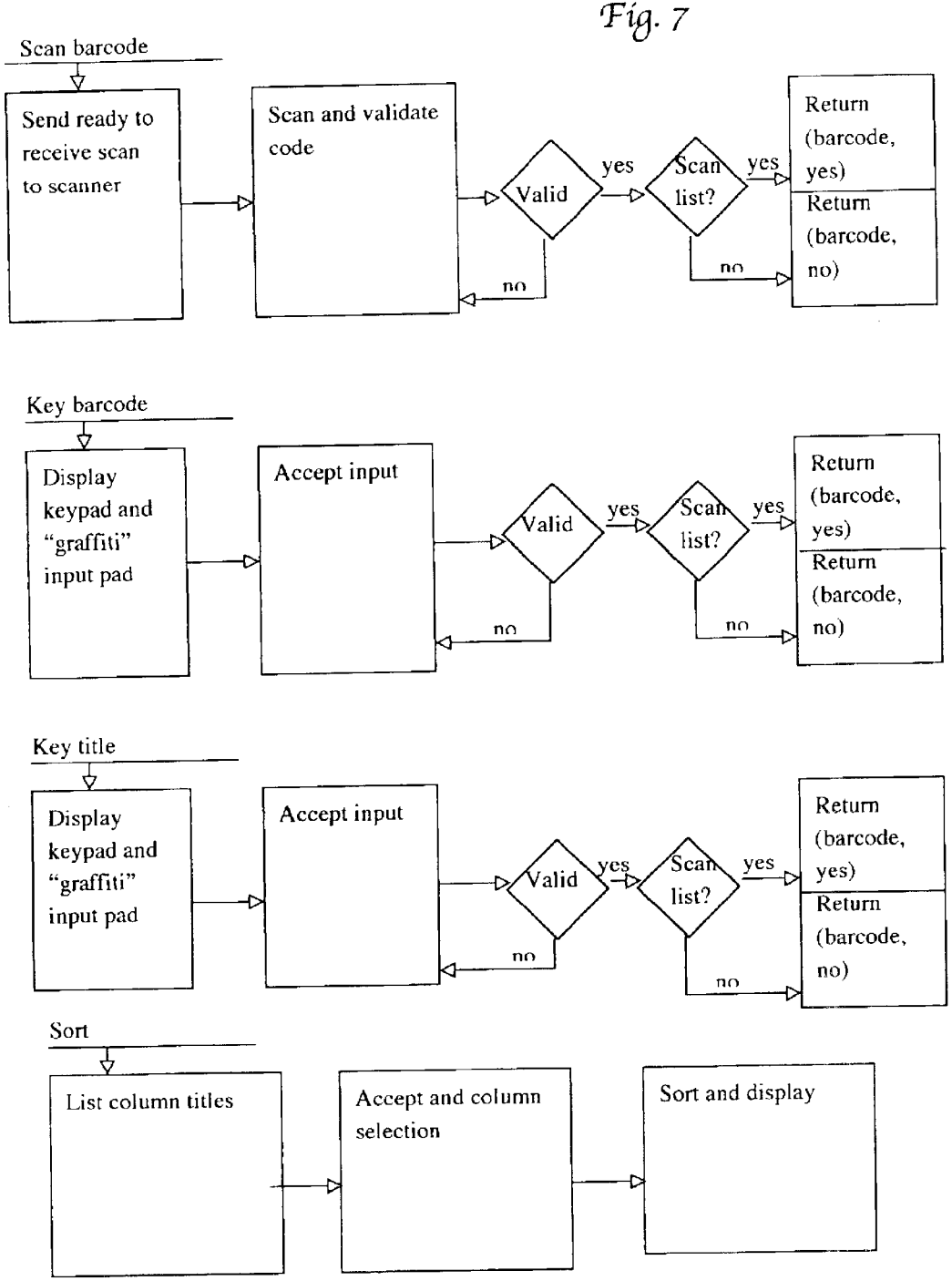
FIG. 7 is a more detailed flow diagram exemplifying software subroutines.

FIG. 6 and FIG. 7 exemplify schematically the type of software programs that could be implemented in combination with a PDA and a barcode reader to achieve functionality as an embodiment of the invention. This software would be well within the capability of a competent programmer to write.

Elements in a development environment which could implement the software include, for example, Microsoft Windows 2000, CodeWarrior for the Palm OS, Palm OS Emulator for Windows, Palm OS Conduit Development Kit, Java for Windows, and Symbol Technology Inc.'s SPT SDK Utility Software.

Existing software which is already in use for inventory management, for PDA applications, for applications involving utilization of barcode scanners, and for creating catalogues and other kinds of manageable databases could be adapted to meet the needs of the present invention. For instance, Readerware (P.O. Box 12325, San Francisco, Calif. 94112-0325) makes software that would be particularly suited to easy adaptation for the purposes of this invention.

The scope of this invention is certainly not limited to the above embodiments. There is a logical adaptation to tie the technology in this system with other systems, particularly ones designed for shopping, and more specifically, for interacting over the internet.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A system for assembling, accessing and maintaining a portable personal inventory, comprising:
   a hand-held controller device providing data processing circuitry, a power supply, a display, a means for manual data entry;
   incorporating a barcode scanner;
   providing software enabling said controller to interpret Universal Product Codes and other barcodes, and to accept data input entered by said means of manual data entry, offering information in human-readable form on said display, which said software decodes by acting upon one or more custom databases, to be supplied by any of a multitude of sources offering preexisting databases or from purpose-built databases;
   providing a machine-readable memory store, including;
   at least one integral custom-made decoding database;
   at least one dynamic memory storage area, said dynamic memory storage area storing one or more editable databases, including a plurality of inventory identification codes and,
   further incorporating software enabling access to said dynamic databases to allow them to be edited in order to keep them up to date, and to allow them to be queried in order to display information for said user.

2. A system for assembling, accessing and maintaining a portable personal inventory, comprising:
   a hand-held controller device providing data processing circuitry, a power supply, a display, a means for manual data entry;
   incorporating a barcode scanner;
   providing software enabling said controller to interpret Universal Product Codes and other barcodes, and to accept data input entry by said means of manual data entry, offering information in human-readable form on said display, which said software decodes by means of one or more custom databases, to be supplied by any of a multitude of sources offering preexisting databases or from purpose-built databases;
   providing a machine-readable memory store, including;
   at least one dynamic memory storage area, said dynamic memory storage area storing one or more editable databases, including a plurality of inventory identification codes;
   further incorporating software enabling access to said dynamic databases to allow them to be edited in order to keep them up to date, and to allow them to be queried in order to display information for said user and
   a portal for digital communication whereby said controller may communicate with other devices via one or more of a number of commonly used means.

3. The system for assembling, accessing and maintaining a portable personal inventory according to claim 2, further including at least one dynamic database not associated with a barcode translation database, whereby data relating to a multitude of household invention items, entered manually or electronically, may be stored.

4. A system for assembling, accessing and maintaining a portable personal inventory, comprising:
   a hand-held controller device providing data processing circuitry, a display, a keypad;
   interfacing with a barcode scanner, and
   providing software enabling said controller to interpret Universal Product Codes and other barcodes, and to accept data input entered by means of, said keypad, offering information in human-readable form on said display, which said software decodes by means of one or more custom databases, to be supplied by any of a multitude of sources offering preexisting databases or from purpose-built databases;
   providing a machine-readable memory store, including;
   at least one integral custom-made decoding database;
   at least one dynamic memory storage area, said dynamic memory storage area storing one or more editable databases including a plurality of inventory identification codes and,
   further incorporating software enabling access to said dynamic databases to allow them to be edited in order to keep them up to date, and to allow them to be queried in order to display information for said user.

5. The system for assembling, accessing and maintaining a portable personal inventory according to claim 4, wherein said controller is equipped for communication with other devices via one or more of a number of commonly used means.

6. The system for assembling, accessing and maintaining a portable personal inventory according to claim 5, further including at least one dynamic database not associated with a barcode translation database, providing storage for data relating to a multitude of household inventory items, entered manually or by electronic means, said data consisting of identification codes representing individual items or group thereof.

* * * * *